US010569526B2

(12) United States Patent
FrantzDale et al.

(10) Patent No.: US 10,569,526 B2
(45) Date of Patent: Feb. 25, 2020

(54) TECHNIQUES FOR ADDITIVE FABRICATION PROCESS OPTIMIZATION AND RELATED SYSTEMS AND METHODS

(71) Applicant: Formlabs, Inc., Somerville, MA (US)

(72) Inventors: Ben FrantzDale, Harvard, MA (US); Steven Thomas, Cambridge, MA (US); Nicholas M. Sohn, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 15/248,626

(22) Filed: Aug. 26, 2016

(65) Prior Publication Data

US 2017/0057178 A1    Mar. 2, 2017

Related U.S. Application Data

(60) Provisional application No. 62/211,352, filed on Aug. 28, 2015.

(51) Int. Cl.
*B33Y 50/02* (2015.01)
*B33Y 10/00* (2015.01)

(52) U.S. Cl.
CPC .............. *B33Y 50/02* (2014.12); *B33Y 10/00* (2014.12)

(58) Field of Classification Search
CPC .................................................. B29C 64/124
See application file for complete search history.

(56) References Cited

U.S. PATENT DOCUMENTS 4,976,001 A * 12/1990 Wright ................. B60S 1/3805
15/250.44
2009/0289384 A1* 11/2009 Maalderink ......... B29C 67/0066
264/40.1

(Continued)

FOREIGN PATENT DOCUMENTS

CN    101489764 A    7/2009
CN    101918198 A    12/2010

(Continued)

OTHER PUBLICATIONS

International Search Report and Written Opinion for International Application No. PCT/US2016/048977 dated Nov. 15, 2016.

(Continued)

*Primary Examiner* — Alex A Rolland
(74) *Attorney, Agent, or Firm* — Wolf, Greenfield & Sacks, P.C.

(57) ABSTRACT

According to some aspects, a method of additive fabrication is provided wherein a plurality of layers of material are formed on a surface of a build platform, each layer of material being formed so as to contact a container in addition to the surface of the build platform and/or a previously formed layer of material. The method comprises forming a layer of material in contact with the container and in contact with a previously formed layer of material, and subsequent to the forming of the layer of the material, separating the layer of material from the container by simultaneously applying a first force to the layer of the material in a direction perpendicular to the surface of the build platform, and a second force to the layer of the material in a direction parallel to the surface of the build platform.

17 Claims, 13 Drawing Sheets

(56) References Cited

U.S. PATENT DOCUMENTS

| | | | |
|---|---|---|---|
| 2011/0310370 A1* | 12/2011 | Rohner | A61C 13/0013 355/53 |
| 2013/0177767 A1 | 7/2013 | Grebe et al. | |
| 2014/0227382 A1 | 8/2014 | Liska et al. | |
| 2014/0265034 A1 | 9/2014 | Dudley | |
| 2014/0361463 A1 | 12/2014 | Desimone et al. | |
| 2016/0059308 A1 | 3/2016 | Volk | |

FOREIGN PATENT DOCUMENTS

| | | |
|---|---|---|
| CN | 102695476 A | 9/2012 |
| CN | 103522546 A | 1/2014 |
| CN | 104136200 A | 11/2014 |
| DE | 19846478 A1 | 4/2000 |
| EP | 1037739 A1 | 9/2000 |
| EP | 2 011 631 A1 | 1/2009 |
| WO | WO 00/21736 A1 | 4/2000 |
| WO | WO 2011/086450 A2 | 7/2011 |
| WO | WO 2014/006399 A1 | 1/2014 |

OTHER PUBLICATIONS

Extended European Search Report for European Application No. 16842681.5 dated Mar. 20, 2019.

\* cited by examiner

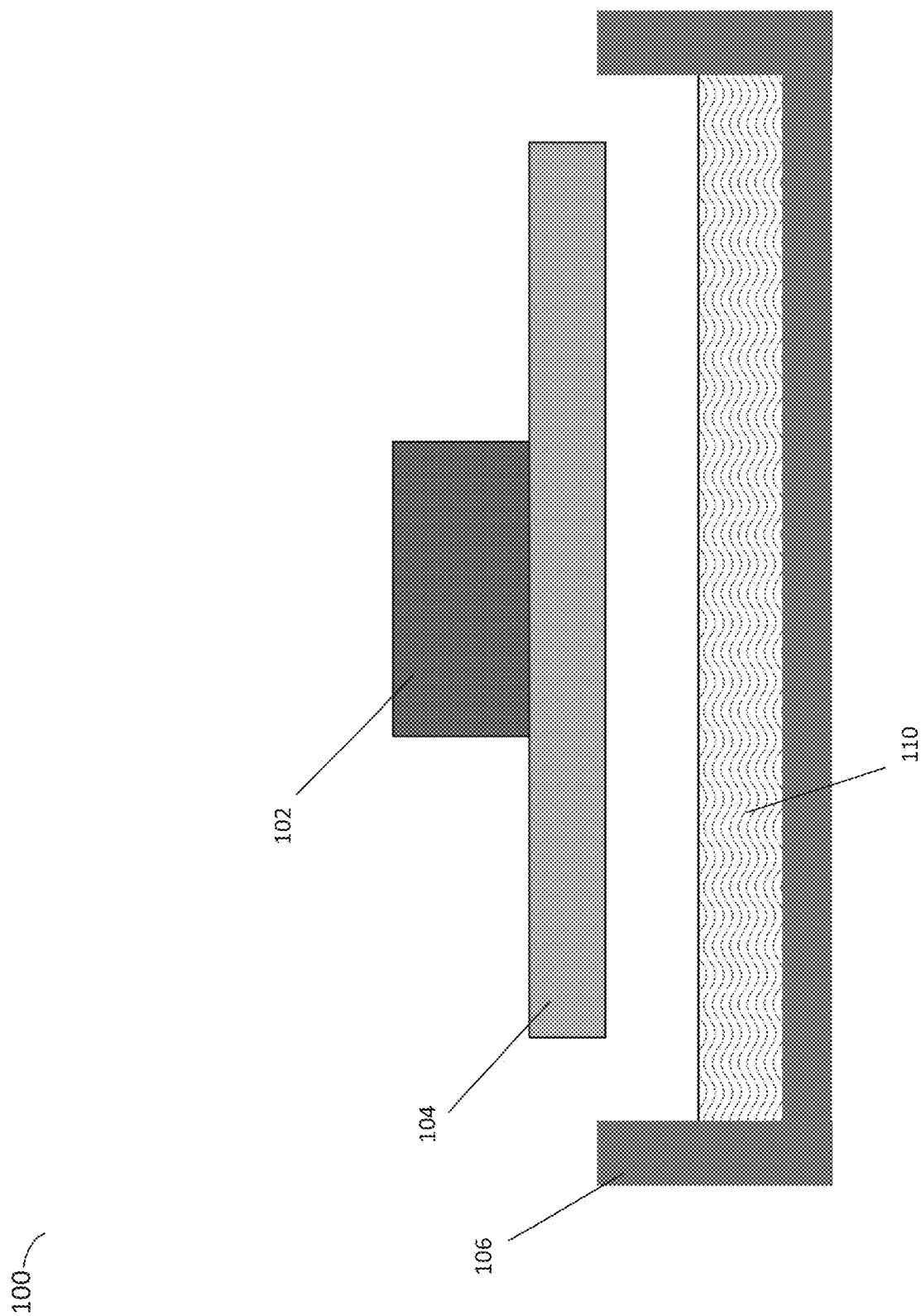

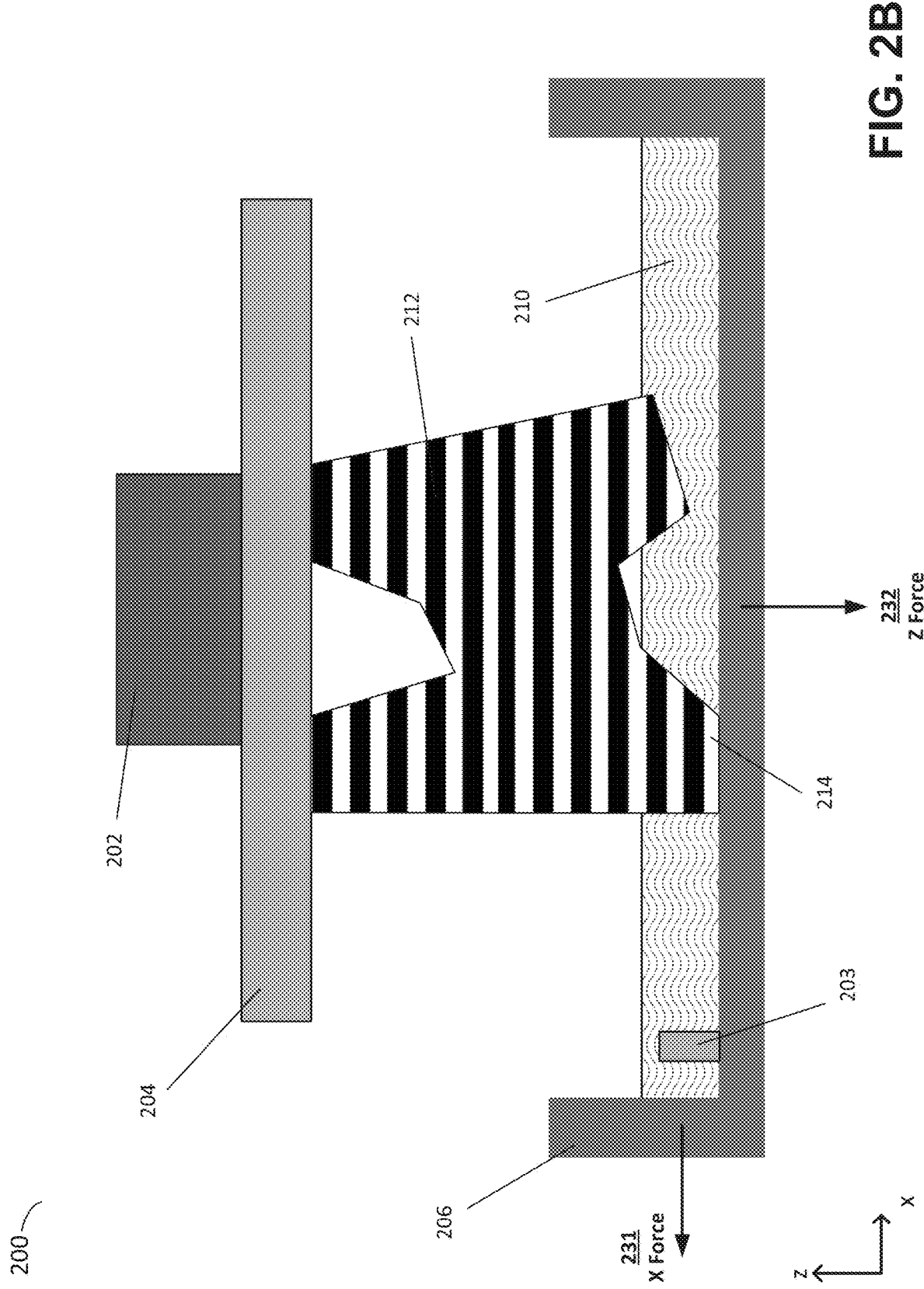

TECHNIQUES FOR ADDITIVE FABRICATION PROCESS OPTIMIZATION AND RELATED SYSTEMS AND METHODS

CROSS REFERENCE TO RELATED APPLICATIONS

The present application claims the benefit under 35 U.S.C. § 119(e) of U.S. Provisional Patent Application No. 62/211,352, filed Aug. 28, 2015, titled "Techniques for Additive Fabrication Process Optimization and Related Systems and Methods," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a build platform and then one on top of another. Exposure to actinic radiation cures a thin layer of liquid resin, which causes it to harden and adhere to previously cured layers or to the bottom surface of the build platform.

SUMMARY

The present application relates generally to systems and methods for process optimization within an additive fabrication (e.g., 3-dimensional printing) device.

According to some aspects, a method of additive fabrication is provided wherein a plurality of layers of material are formed on a surface of a build platform, each layer of material being formed so as to contact a container in addition to the surface of the build platform and/or a previously formed layer of material. The method comprises forming a layer of material in contact with the container and in contact with a previously formed layer of material, and subsequent to the forming of the layer of the material, separating the layer of material from the container by simultaneously applying a first force to the layer of the material in a direction perpendicular to the surface of the build platform, and a second force to the layer of the material in a direction parallel to the surface of the build platform. Magnitudes of the first force and second force may be calculated, by at least one processor, based at least in part on one or more of a degree to which the layer of the material contains overhangs. The method may further comprise moving a wiper across the surface of the container.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B depict an illustrative additive fabrication system, according to some embodiments;

FIGS. 2A-2H depict various stages during between formation of two consecutive layers of an object by an illustrative additive fabrication system, according to some embodiments;

DETAILED DESCRIPTION

Figure 1B:
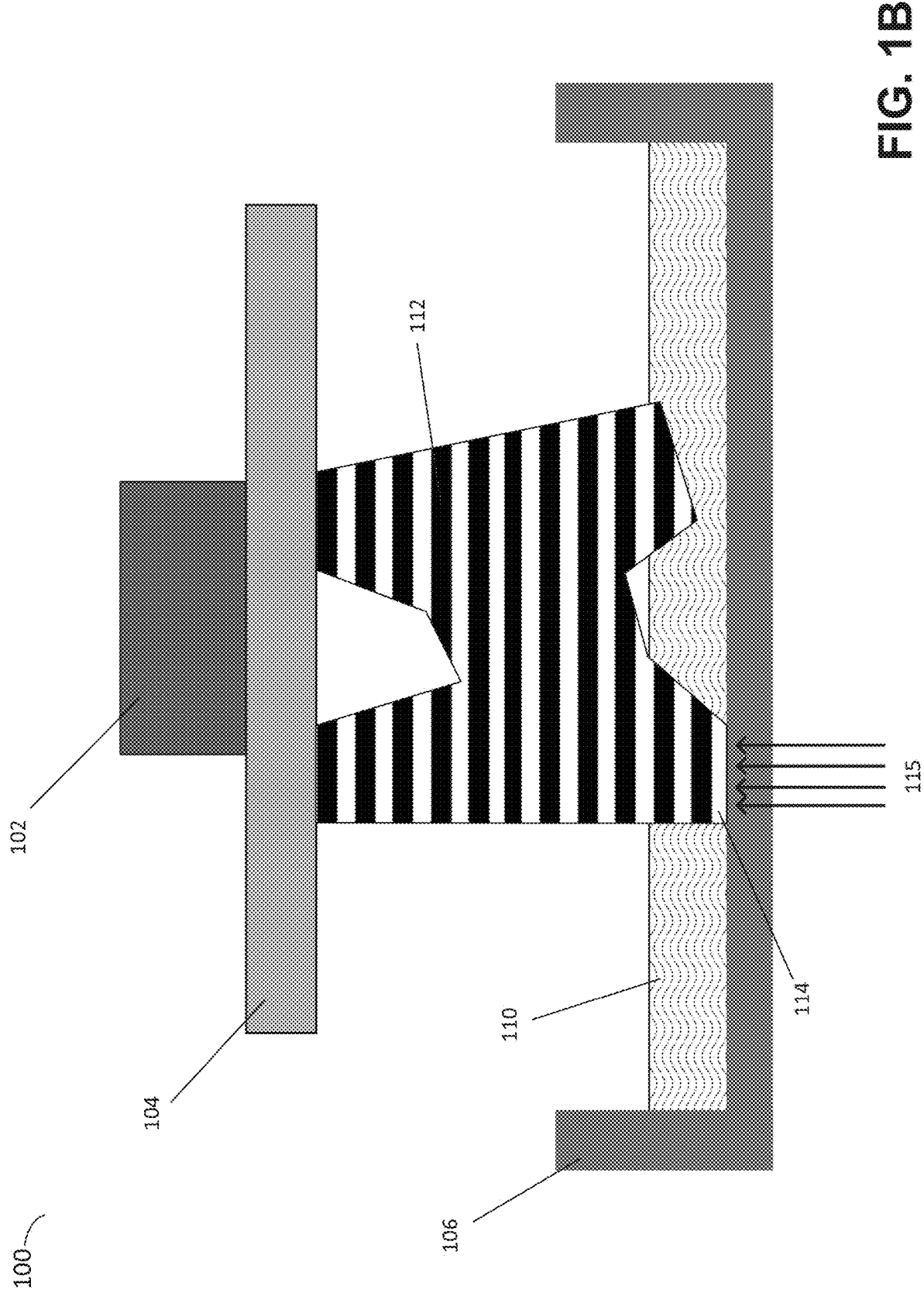

As discussed above, some additive fabrication techniques form solid objects by solidifying (also referred to herein as "curing") a liquid, such as a photopolymer resin. In some such devices, a layer of solid material is formed such that it adheres to either a previously formed layer or a substrate upon which the object is built, in addition to another surface, such as a container. In such devices, numerous problems can arise from the application of force necessary to separate the layer from the surface (e.g., container) while retaining adhesion of the object being fabricated to the substrate. It is generally inherent in separation mechanisms that force is applied to, and through, the object itself, yet this application of force can result in several potential problems.

In some instances, force(s) applied to the object being fabricated may cause the object to separate partially or totally from the build platform, rather than the container, thus disrupting the formation process. In some instances, the force applied to the object may cause deformation and/or mechanical failure in the object itself. Irrespective of which one or more of these potential problems might arise, it may be desirable to minimize the separation force(s) during separation of the object from the surface. While a relatively higher force can provide separation more quickly, it can produce a comparatively higher risk of deformation in the fabricated object, whereas a relatively lower force, applied over a longer period of time, will typically furnish a more precisely fabricated object. One potential approach is to progressively separate the object and the container, such as in a peeling operation. While this solution has a number of advantages, the process can still introduce unwanted forces during the separation process.

Moreover, sometimes during additive fabrication a region of liquid may be cured to a solid or partially solid state but fail to adhere to the object being fabricated. This may occur for a variety of reasons, such as an incompletely performed curing operation and/or adhesion of cured or partially cured material to a surface other than the object being fabricated (e.g., to a container). When this occurs, the cured or partially cured material may subsequently interfere with the successful forming of a remainder of the object, such as by adhering to an undesired location on the object and/or by inhibiting the correct formation of subsequent material (e.g., by blocking the path of a radiation source, by mechanically sticking to the object and thereby introducing undesirable forces, etc.).

An additional problem that can occur during additive fabrication is incomplete curing of resin that does adhere to the object being fabricated. That is, a fabricated layer of the object may include one or more regions in which the resin is partially cured. As used herein, "partially cured" refers to material that has been cured to some extent by actinic radiation yet is chemically able to undergo additional curing to form resin with greater structural stability and/or strength. In some cases, partially cured resin can be further cured by application of additional actinic radiation. In some cases, partially cured resin can be further cured simply by waiting for chemical reactions already initiated by the actinic radiation to progress further without necessarily providing additional actinic radiation.

Partially cured resin can lead to structural instability, imprecise reproduction of the desired object, and/or fabrication failure. The inventors have recognized that such problems are typically produced as a result of either non-homogeneities and/or motion of the photopolymer resin, and/or by insufficient curing of portions of the resin.

In view of the above-described problems, the inventors have recognized and appreciated an optimized additive fabrication process that mitigates one or more of these problems. In particular, the optimized process includes a number of operations that each mitigate one or more of the above-described problems. In some embodiments, the operations may be adapted based on the geometry (shape, size, etc.) of the object being printed so as to maximize the quality of the particular fabricated object being produced.

The optimized process described herein includes a number of operations that may be performed between successive applications of actinic radiation to cure photopolymer resin as described above. To provide an initial overview of the curing process, an illustrative additive fabrication system is depicted in FIGS. 1A-1B. Illustrative stereolithographic printer 100 forms an object in a downward facing direction on a build platform such that layers of the part are formed in contact with a surface of a container in addition to a previously cured layer or the build platform. In the example of FIGS. 1A-1B, stereolithographic printer 100 comprises build platform 104, container 106 and liquid resin 110. A downward facing build platform 104 opposes the floor of container 106, which contains a photopolymer resin 110. FIG. 1A represents a configuration of stereolithographic printer 100 prior to formation of any layers of an object on build platform 104.

As shown in FIG. 1B, an object 112 may be formed layerwise, with the initial layer attached to the build platform 104. In FIG. 1B, the layers of the part 112 are each formed from the same material but are shown in alternating colors merely to visually distinguish them in this example. The container's base surface may be transparent to actinic radiation, such that radiation can be targeted at portions of the thin layer of liquid photocurable resin resting on the base surface of the container. Exposure to actinic radiation 115 cures a thin layer of the liquid resin, which causes it to harden. The layer 114 is at least partially in contact with both a previously formed layer and the surface of the container 106 when it is formed. The top side of the cured resin layer typically bonds to either the bottom surface of the build platform 104 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

As discussed above, a number of problems can potentially occur during this process, including incomplete curing of resin attached to the part, incomplete or complete curing of resin that remains in the container (adhered to the container and/or floating) and damage to the structure of the part during the peel process. The inventors have recognized and appreciated a number of operations that together mitigate at least these problems, which are described in the illustrative process of FIGS. 2A-2H.

FIGS. 2A-2H depict various stages during between formation of two consecutive layers of an object by an illustrative additive fabrication system, according to some embodiments. FIGS. 2A-2H depict illustrative stereolithographic printer 200, which includes build platform 204, container 206, liquid resin 210 and wiper 203. The wiper 203 is configured to move along the horizontal axis of motion parallel to the base of the container 206. In some cases, the wiper is removably mounted onto a support base beneath the container 206 and to which the container is attached.

Figure 2A:
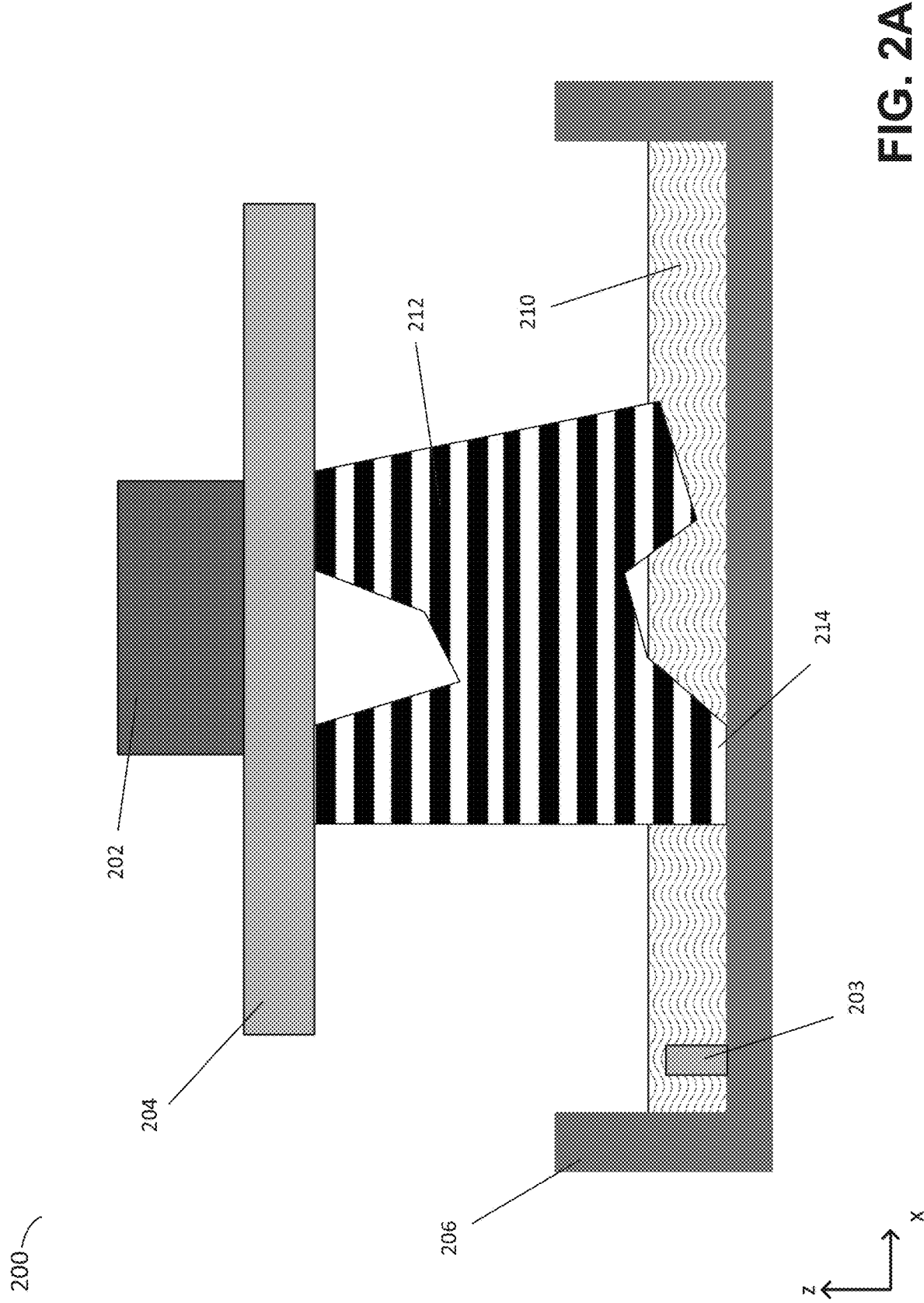

FIG. 2A depicts the illustrative stereolithographic printer immediately after application of actinic radiation which causes a portion of the liquid resin to cure and form layer 214 of the part 212 being fabricated. According to some embodiments, it may be advantageous to delay subsequent steps following exposure to the actinic radiation in order to provide time for chemical reactions initiated by said exposure to occur and/or to complete. This delay is referred to herein as a "cure delay," and can mitigate the above-described problem of partially cured resin, which can reduce the structural integrity of an object being fabricated.

As an illustrative example, photopolymer resins such as methacrylate radical-cured photopolymer resin may substantially increase in structural stability and strength in 0.5 seconds to 1.5 seconds after exposure to actinic radiation that initiates polymerization. As such, waiting for a cure delay period of between 0.5-1.5 seconds performed immediately after cessation of actinic radiation to the object can be performed to increase the quality of the object being fabricated. Other cure delay time periods may also be suitable, such as between 0.2 s-2.0 s, between 0.5 s-1.0 s, between 0.75 s-1.25 s, or between 0.8 s-1.2 s.

According to some embodiments, the optimal length of a cure delay period may be determined based upon one or more of a number of factors, including the energy level of the actinic radiation, the chemistry of the photopolymer resin, the temperature of the photopolymer resin, and the geometry of the newly formed layer 214. Cure delays, such as delays of between 0.5 seconds and 1 second, may provide a sufficient time for photopolymer reactions initiated by actinic radiation to induce sufficient material strength to avoid unwanted distortion and/or mechanical failures in subsequent steps. In some embodiments, the optimal delay period may be calculated based upon whether particular regions of the newly formed layer have completed fabrication or not.

As an example, it may be advantageous in certain embodiments when determining the length of a cure delay to distinguish between exposure of the perimeters of the newly formed layer, typically corresponding to the outside of the object, and the interior area, sometimes known as the "fill," or "infill." For example, the perimeter of a layer may be exposed prior to the exposure of the fill and an optimal cure delay period determined based upon the completion of said perimeter exposure, rather than based upon the completion of said fill exposure, where the cure delay is timed to begin when the perimeter exposure has been completed. As may be appreciated, such perimeter exposures may be more sensitive to unwanted distortion due to cosmetic concerns.

In FIG. 2B, the cure delay period has ended and an operation to separate the object 212 from the container 206 is initiated. The application of force to the object to separate it from the container may be necessary due to adhesive and/or fluid forces. For instance, the photopolymer may have adhered to the container during the curing process and/or the absence of liquid between the cured photopolymer and the container may produce suction forces acting against separation of the two. Irrespective of the source of the attachment between the object and the container, such attachment must be broken in order to continue the formation process. This attachment can be broken using various techniques, including by horizontally sliding the container, by rotating the container about an axis (e.g., at the edge of the container), by moving the container downwards away from the build platform, or by combinations thereof.

In some embodiments, attachment between the object and container may be reduced by applying a force to container 206 along an x-axis, shown as force 231 in FIG. 2B). In some cases, the container 206 may be coupled to a supporting structure (e.g., beneath the container) that is moved in the x-direction, thereby producing the force 231 in the x-direction. In addition, or as an alternative, such attachment may be reduced by applying a force to the object 212 through the z-axis, shown as force 232 in FIG. 2B. The force 232 may be produced by translating the build platform 204 up along the z-axis, and/or by moving the container 206 down along the z-axis.

According to some embodiments, the system may apply forces to the container in both the x-axis and z-axis directions in order to effectively separate the object from the container. In particular, the inventors have determined that it may be advantageous to apply a force in the z-axis direction, referred to herein as a "preload force," prior to initiating application of a force along the x-axis. In many cases, the z-axis force may not result in actual movement of the build platform relative to the bottom of the container due to the attachment between the newly formed layer 214 and the bottom of the container. The preload force, however, may instead introduce forces that begin to overcome such attachment.

As one example, the inventors have recognized that a desirable magnitude of the preload force may be calculated based on the effective surface area of the layer just fabricated (e.g., the area of layer 214 facing the container 206 in FIG. 2B). In some cases, the magnitude of the preload force may be determined by interpolating based upon predetermined effective area calculations. For example, values of the ideal preload force may be predetermined for two or more corresponding values of the layer area size. During fabrication, the additive fabrication system may determine the layer area of the layer just fabricated and perform linear interpolation between the two nearest layer area values and their corresponding preload force values to dynamically determine a suitable preload force to apply. The calculated force can then be applied through the z-axis as discussed above.

In some cases, it may be advantageous to dynamically determine a magnitude of the preload force by reference to previously calculated values for given ranges of effective areas. Said values may be experimentally determined so as to ensure successful layer formation. The inventors have recognized that geometrical features of the just-fabricated layer may be advantageously considered in determining said values. As one example, the optimal magnitude of the preload force may be calculated based on the ratio of the area to the perimeter of a layer just fabricated.

According to some embodiments, separation forces may be simultaneously applied in both the x- and z-directions. Such forces may be applied subsequent to a preload force applied in the z-direction, should a preload force be applied as described above. The combined x- and z-direction forces may separate the object 212 from the container, then cause the object to move to a predetermined position relative to the container. The velocity and distance of such motions may be set to constant values, determined experimentally, to ensure successful layer formation. Since the x- and z-direction forces may have variability in how much force is necessary to separate the objects, the amount of time during which the forces are applied prior to separation may vary from layer to layer during fabrication.

According to some embodiments, the absolute and relative magnitudes of forces applied in the x- and z-directions may be dynamically determined based upon numerous factors, including the geometry of the layer just fabricated, the geometry of one or more prior fabricated layers (e.g., the second-to-previous layer fabricated, etc.), the height of the build platform above the bottom of the container, and/or the viscosity of the photopolymer resin. The determined forces may be applied simultaneously in the separation operation.

As an example, the inventors have recognized that the optimal magnitude of the force applied in the x-direction may be inversely proportional to the length of the longest extent of the just-fabricated layer of the object measured in the x-axis. In some embodiments, therefore, the additive fabrication system can determine the extent of the just-fabricated layer of the object along the x-axis and calculate a magnitude of a force to apply along the x-direction during separation. Since layers of an object will generally have a different size and shape through a fabrication process, x-axis forces determined in this manner will therefore generally change in value from layer to layer.

In some implementations, the separation force applied along the x-axis may be calculated based on the length of the layer in the x-axis as described above yet further modified when the length is above some cutoff value. For example, for lengths less than a critical value, such as the expected distance that the container will move in the x-direction as a result of application of the x-direction force (or this distance multiplied by a factor between 0.9 and 1.1), the magnitude of the x-direction force may be modified. However, for x-axis lengths greater than this critical value, the x-axis force calculated as described above may be reduced by k, wherein k is experimentally determined based upon the configuration of the system to ensure reliable part formation. In general, optimal values of k may be found by increasing k (thereby reducing the force applied) until print failures occur, such as those caused by failures to detach due to inadequate force exerted in the x-axis direction. In some embodiments, it may be preferred to optimize for print success, rather than for minimal forces, and thus in some cases an optimal value of k may be determined by increasing k until the forces exerted in the x-axis direction are above the threshold where part separation failures are observed.

The inventors have also recognized that the optimal magnitudes of separation forces including the preload force and/or subsequent forces in the x- and/or z-directions may depend upon the viscosity of the photopolymer resin used in the additive fabrication device. In some embodiments, therefore, each of the preceding force magnitude calculations may be further based upon a standardized viscosity measurement V. In such embodiments, said force magnitudes may be calculated by multiplying the result achieved via the above procedure(s) multiplied by a factor of the actual (working) viscosity of the photopolymer divided by the standardized viscosity measurement resin to be used. As may be appreciated, the actual viscosity of the photopolymer resin may be determined experimentally for a given operating temperature or determined experimentally for a reference temperature and adjusted based upon the actual temperature of the photopolymer resin.

According to some embodiments, magnitudes of separation forces including the preload force and/or subsequent forces in the x- and/or z-directions may be determined based on a degree to which a given layer of the object contains overhangs, referred to herein as an overhang degree. An overhang is an area of a layer that does not attach to either the build platform or to a layer formed immediately prior. Overhangs may affect how the object is able to withstand forces applied during the separation process due, in part, to the fact that areas of overhang may be more susceptible to deformation, depending on the mechanical strength of the layer areas forming the overhang. Different shapes of overhangs may have differing mechanical strengths. In some cases, for example, an overhang area may extend out from non-overhanging areas, and thus be supported on only one edge of the overhang. In other cases, however, an overhanging area may extend from more than one non-overhanging area such that more than one edge of the overhang is supported. As will be appreciated, such overhangs share many mechanical properties with a bridge, and are in fact sometimes known referred to as bridges. Various heuristics may be utilized to characterize an overhang degree.

In some implementations, the overhang degree in a given layer N is characterized by the area of the Boolean difference between the current layer (N) and the previous layer (N−1). In some implementations, overhang degree is characterized by the maximum distance from an overhanging point to a non-overhanging point. In some implementations, an overhang degree may be determined by a structural analysis of overhanging areas, such as finite element analysis (FEA), based on the expected maximum allowable loading on overhang structures. An example of such a FEA technique may be found in U.S. patent application Ser. No. 14/543,138, titled "Systems and Methods of Simulating Intermediate Forms for Additive Fabrication," filed on Nov. 17, 2014, and which is hereby incorporated by reference in its entirety.

In some embodiments, an overhang index may be calculated in the following manner: first, the area of all overhang portions, as determined based on Boolean comparison with the proceeding layer, is determined; next, overhanging areas of regions with an area greater than some cutoff value (e.g., 0.5 mm$^2$) are summed together and the square root of such areas are determined; finally, the overhang index is prepared by mapping said square root value to a linear scale of 0.0 to 1.0, wherein 0.0 represents an area square root value of 0 and 1.0 represents area square root values of more than 5 mm. Magnitudes of separation forces including the preload force and/or subsequent forces in the x- and/or z-directions may be determined based on the overhang index determined via this process. For example, in some implementations, calculation of one or more such separation forces may be based on a factor of $\frac{1}{3}^I$, where I is the overhang index having a value between 0 and 1 (e.g., the force may be equal to a calculated value multiplied by this factor).

In some embodiments, magnitudes of separation forces including the preload force and/or subsequent forces in the x- and/or z-directions may be determined based on a degree to which a given layer of cured resin forms a portion of a feature or area of an object that is substantially more fragile than other portions of the object, referred to herein as a fragility degree. The fragility degree may vary between layers, depending on, among other factors, the geometry of a given layer. In some embodiments, a fragility degree may be ascertained by performing a structural analysis and/or finite element analysis of the object to determine which regions have a lower resistance to separation forces compared with the average resistance of the object being fabricated.

In some implementations, the fragility degree may be determined based on the extent to which a layer contains isolated regions of surface area below a threshold value. In some implementations, a fragility degree may also be determined based upon the extent to which a layer contains regions of high aspect ratio in their dimensions. In some implementations, a fragility degree may be characterized by a ratio of layer surface area to layer perimeter length.

With respect to FIG. 2B, the proceeding examples have been described with reference to determinations made based on the layer 214 currently being deposited and separated from the container 206. In some cases, however, it may be advantageous when calculating one or more separation forces to also consider similar properties in layers formed before or after the current layer. As one example, the inventors have noted the layers previously formed may restrict the flow of liquid resin such that the forces involved during separation tend to be increased. In this way, previously formed layers of high surface areas may tend to influence the current layer and increase an effective adhesion index (a measure of adhesive forces) for the current layer. In testing, the inventors have found that for a resin with viscosity on the order of 800 cP, properties of layers located up to 2 mm above the last fabricated layer may be considered when calculating indexes such as adhesion index, overhang index, and fragility index, among others.

According to some embodiments, magnitudes of separation forces including the preload force and/or subsequent forces in the x- and/or z-directions may be determined based on a degree to which the useful life of a resin container has been expended, referred to herein as a wear degree. Some resin containers may be constructed with materials chosen for their low reactivity and adhesion coefficients. Over time, however, the material properties of many resin container designs tend to change, due in part to the mechanical and chemical stresses incurred when each layer is formed and removed from the resin container floor. Such changes in material properties typically result in increased object failure rates due to an increase in the adhesive forces. The wear degree characterizes the extent to which a given build tray may have suffered such degradation. The wear degree may vary between prints as well as between layers, as the build tray's useful life decreases with each layer formed and removed.

Numerous heuristics may be considered to characterize the wear degree. As one example, the inventors have observed that the wear degree of a container may be related to the aggregate number of layers fabricated using that container. In some cases, the wear degree may be calculated from a linear or nonlinear function of the aggregate number of layers and/or of the expected average maximum number of layers for a given resin container design. In addition, it may be advantageous to track the wear degree for a given resin container for different regions of the resin container, given the tendency for layer formation to be concentrated at the center of a resin container.

Any of the above-described techniques in which various characteristics of the additive fabrication device and/or object being fabricated are considered when calculating the magnitude of one or more separation forces may be combined and used together. As described above, consideration of various characteristics may be performed in practice using a factor calculated through the above-described analysis. It will be appreciated that separation forces can be calculated by multiplying together several such factors with an initial force value to arrive at a separation force value that is applied via the additive fabrication device. Such a calculation may be performed by hardware of the additive fabrication device and/or by a computing device that provides fabrication instructions to the additive fabrication device, and may be performed during additive fabrication and/or prior to the beginning of fabrication.

Figure 2C:
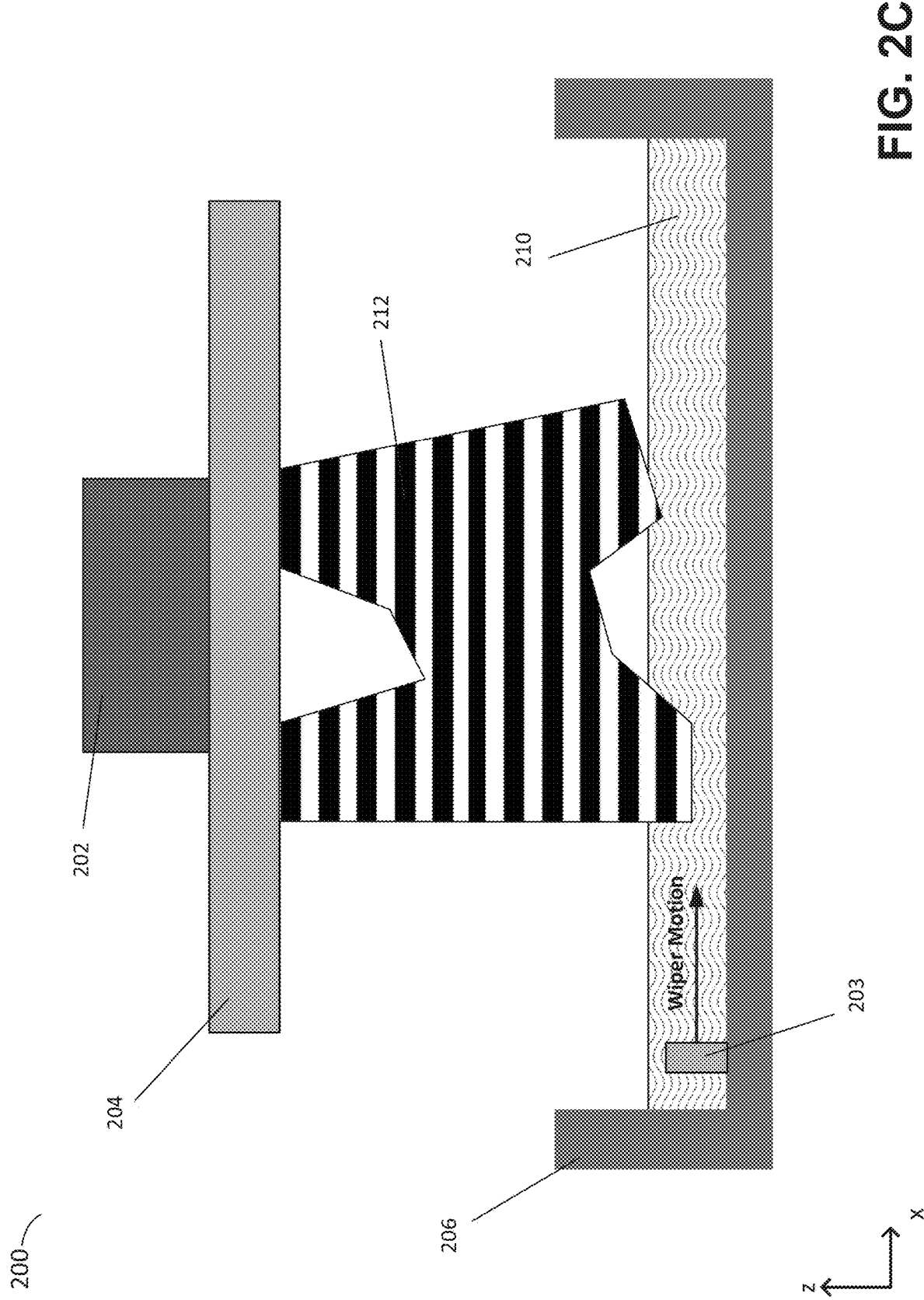

Irrespective of which of the above-described techniques for calculating separation force(s) are followed, after the separation, object 212 may be raised by moving build platform 204 up along the z-axis, thereby producing the configuration shown in FIG. 2C.

In the example of FIGS. 2A-2H, after separation is at least partially completed, the wiper 203 begins to move across the surface of the container 206. According to some embodiments, the wiper may be configured to remove pieces of resin adhered to the container and not attached to the object 212 after separation. In some cases, wiper 203 may be a wiper as is described in U.S. patent application Ser. No. 15/248,295, titled "Techniques For Surface Preparation During Additive Fabrication and Related Systems And Methods," filed on Aug. 26, 2016, and which is hereby incorporated herein by reference in its entirety. In some embodiments, the wiper may comprise a wiper arm and a wiper blade coupled to said wiper arm using a pivoting coupling.

According to some embodiments, wiper 203 may be moved across the surface of the container and subsequently returned to its starting position, as shown in FIGS. 2C, 2D, 2E and 2F, prior to the formation of an additional layer. In some embodiments, it may be advantageous to limit the motion of the wiper 203, such that wiper 203 is free to travel only within a region of the bottom of container 206, such as a region expected to be used for the formation of an additional layer of the object.

The inventors have recognized that a wiper having a height H may begin a wiping motion as soon as the object has been moved up along the Z axis by at least a distance of H. Moreover, given that the object may be moved up along the Z axis while the wiper moves, it is further possible to begin wiper motion before the clearance of H has been established, so long as the wiper will not reach any portion of the object being formed prior to that portion of the object reaching the clearance height of H. Indeed, in the example of FIGS. 2C-2D, the wiper 203 begins to move prior to the object 212 reaching a sufficient height to clear the motion of the wiper (the object reaches such a height in FIG. 2D).

According to some embodiments, a time at which to being motion of the wiper may be determined using a suitable collision detection technique. In some implementations, for example, a bounding box of the union of all layers in the object within a distance H from the bottom of the object may be calculated and used to check for potential collisions between a planned wiper motion along the x-axis and a planned motion of the build platform and object along the z-axis. Moreover, the same technique may be utilized, in reverse, in order to move the wiper across the bottom of the container while the build platform and object are moved down, such as in a squish operation to be described below.

Figure 2D:
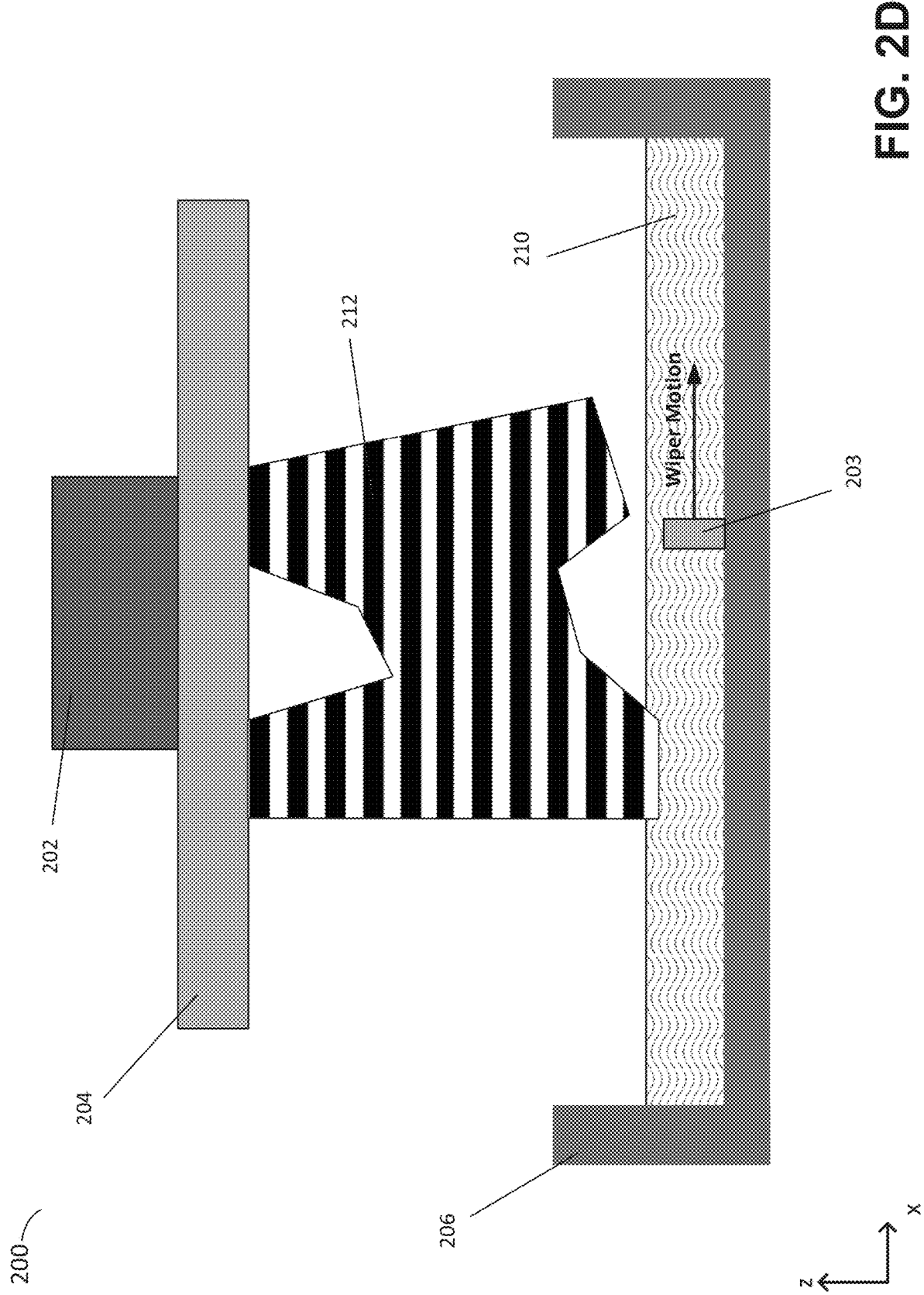
Figure 2E:
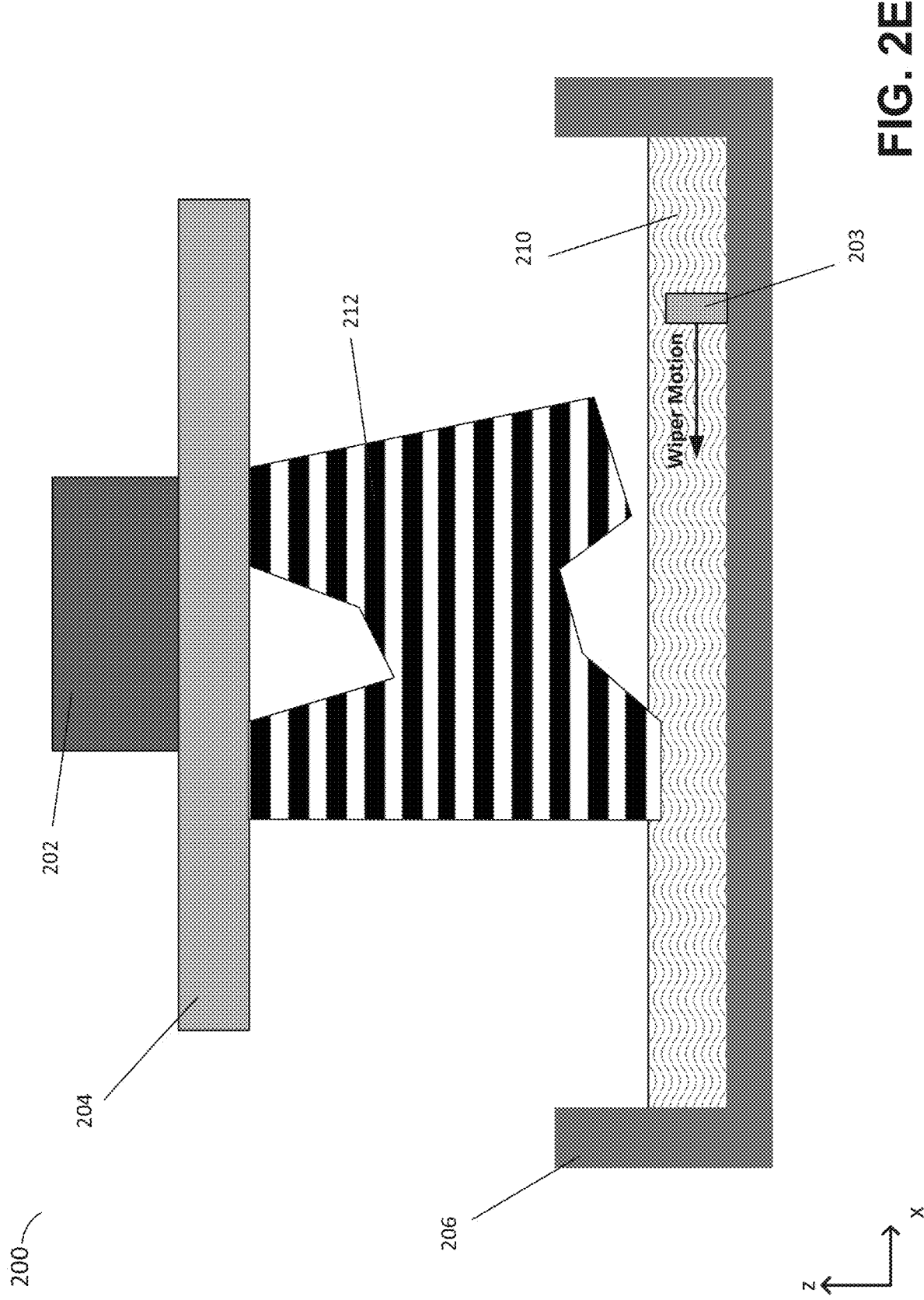
Figure 2F:
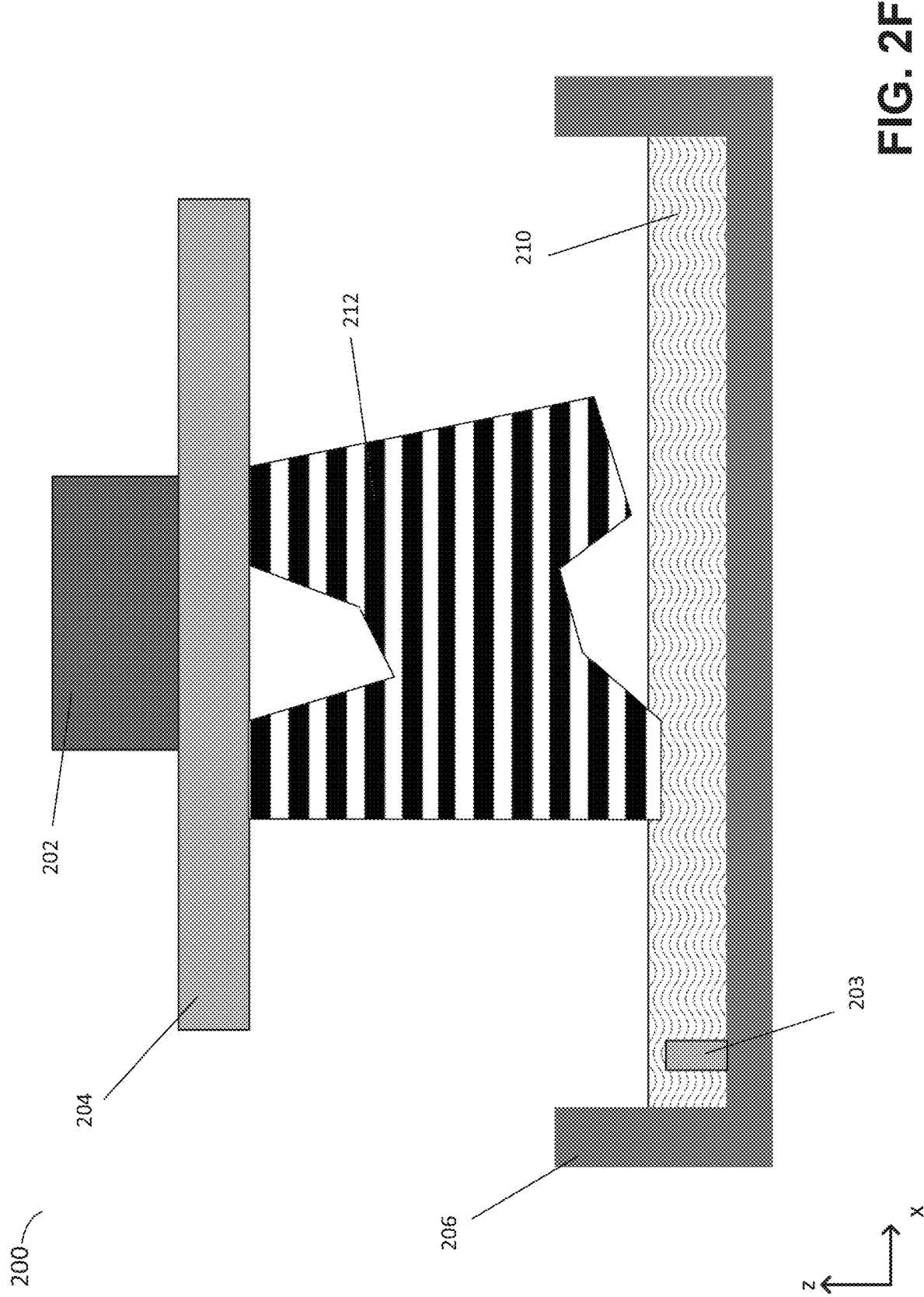
Figure 2G:
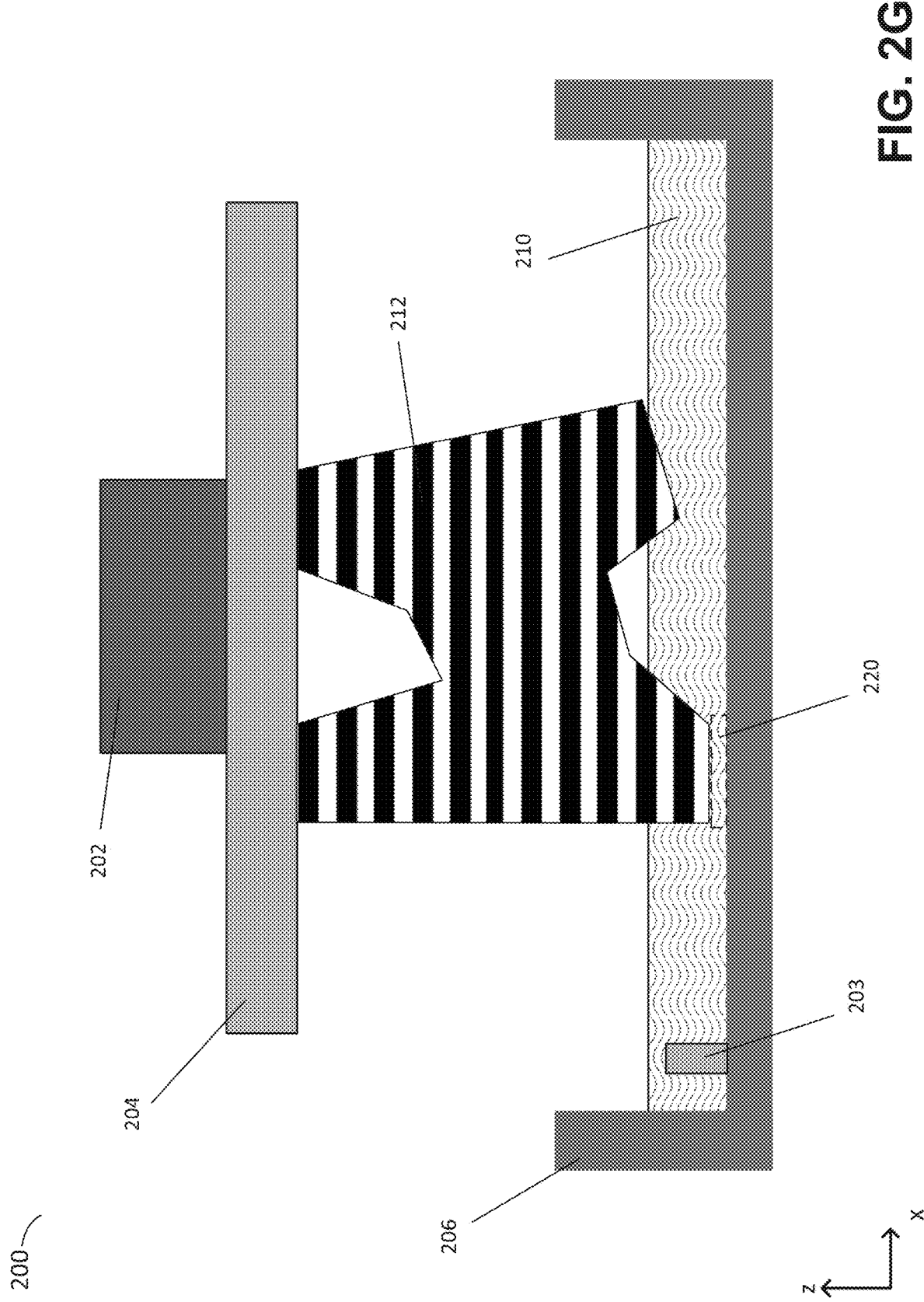

Subsequent to completion of the wipe operation, the build platform 204 may be lowered along the z-axis into position for the formation of a new layer onto object 212. During this stage, referred to herein as a "squish" stage, photopolymer resin located between the bottom of object 212 and the bottom of the container 206 may be pushed out as the object descends, finally resulting in a layer of photopolymer resin of a desired thickness between the bottom of the object 212 and the bottom of the container 206. The end of such a squish motion is shown in FIG. 2G, with region 220 being a region of photopolymer resin to be targeted for curing in a subsequent curing operation.

In some embodiments, it may be advantageous to delay for a period, known as a "post-squish wait," before subsequently exposing the region of photopolymer resin 220 to actinic radiation. In particular, the inventors have recognized and appreciated that immediately after the squish operation, at least some of the liquid resin the container 206 may be in motion. To begin curing of the resin without a wait may therefore risk curing of regions of resin whilst those regions are in motion. This can reduce the accuracy of the object being fabricated because the cured portions may not finish curing in their intended location. Furthermore, such effects may negatively impact the structural integrity of the object.

According to some embodiments, a post-squish wait period may be set to a sufficiently high constant value, determined experimentally, to ensure successful layer formation. As an example, a post-squish wait of between 0.1-0.5 seconds after the completion of the squish motion may allow various components in the system to reach an equilibrium state under the various static and fluid forces applied.

In some embodiments, post-squish wait periods may be dynamically determined based upon numerous factors, including the geometry of the current layer, the geometry of prior layers, the height of the build platform above the bottom of the container, and the viscosity of the photopolymer resin used. As one example, a greater post-squish wait period may be selected when it is determined that the surface area of the layer about to be fabricated and/or the surface area of any previous layer within a distance of 2 mm from the layer about to be fabricated is above an average surface area for the layers of the object.

In some cases, motion of the surface of the build platform through the photopolymer resin may influence how the resin spreads out in the container both during said motion and for a time after the build platform stops moving. As such, when the lower surface of the build platform is in contact with the photopolymer resin, it may be advantageous to consider the surface area of the build platform as if it were one or more prior layers of the part for the purposes of calculating a post-squish wait. Additionally, as the viscosity of the photopolymer resin used increases, it may be advantageous to increase the post-squish wait in order to allow the liquid resin to settle into a uniform thickness in the container. As such, the post-squish wait may be determined based on a viscosity of the resin.

As one example, the inventors have recognized that it is desirable to calculate the post-squish delay based on the effective area of the layer about to be formed immediately after the post-squish wait ends. In some embodiments, this recognition leads to the following optimization strategy: A maximum squish delay time may be experimentally determined for the full area of the build platform. The effective area of the layer to be formed may then be determined and the maximum post-squish delay determined by linear interpolation, wherein a zero-area cross section has no post-squish delay and the full area of the build platform receives the maximum post-squish delay. In some embodiments, said effective area may be simply determined by geometric analysis of the layer to be formed. In other embodiments, however, it may be advantageous to consider the geometry of previously formed layers, as well as the build platform, so as to account for their influence in the fluid forces exerted during a squish operation. In some embodiments, such influences may be accounted for by calculating the effective area of the layer to be formed by summing the area of the layer to be formed with the effective area of each previously formed layer, each multiplied by a factor representing the extent to which the previously formed layer is calculated to influence the squish operation. This factor may be determined experimentally by dividing the observed flow coefficient by resin viscosity. In some embodiments, a factor of 0.75-0.85 per 100 μm in layer height has been found to be effective. And, as will be appreciated, post-squish wait calculated as provided above may be further optimized based on additional parameters.

Figure 2H:
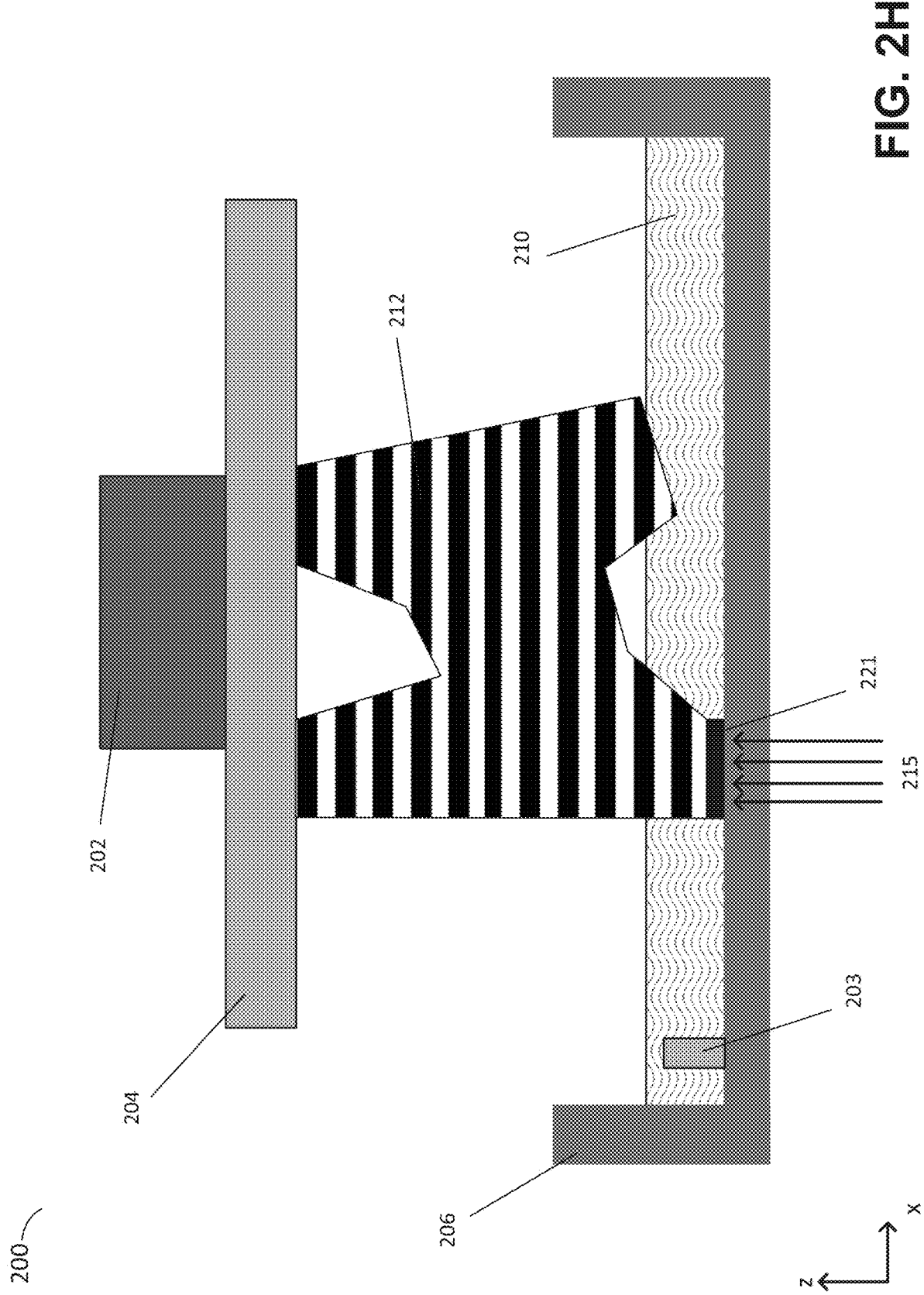

Once the squish wait operation completes, actinic radiation may be applied to form a new layer 215, as shown in FIG. 2H. The process of FIGS. 2A-2H may then be repeated for each layer of the object.

Figure 3:
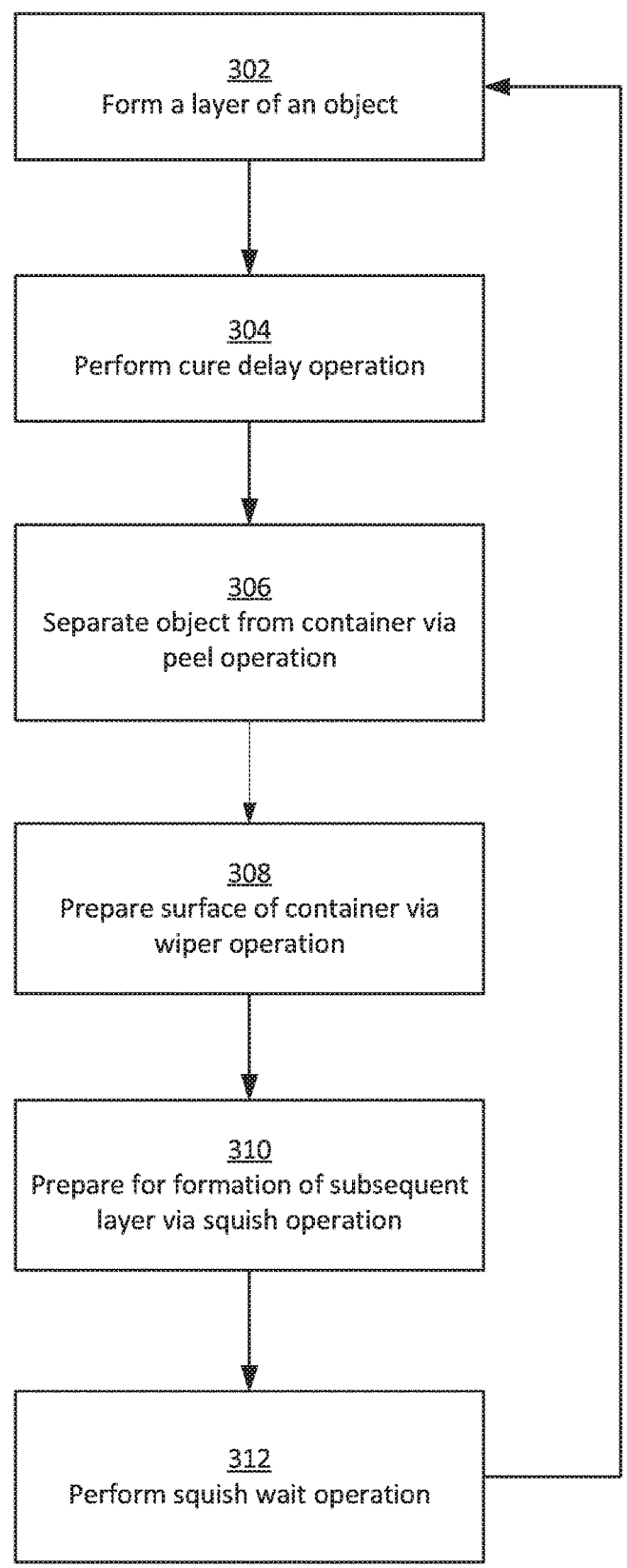
FIG. 3 is a flowchart of a method of process optimization for additive fabrication, according to some embodiments.

FIG. 3 is a flowchart of a method of process optimization for additive fabrication, according to some embodiments. Method 300 performs the sequence of operations described above in relation to FIGS. 1B and 2A-2H.

In act 302, a layer of an object may be formed via application of actinic radiation as shown in FIG. 1B and FIG. 2A. In act 304, a cure delay operation may be performed as shown in FIG. 2A. In act 306, a separation operation may be performed as shown in FIG. 2C. In act 308, a wipe operation may be performed as shown in FIGS. 2D-2F. In act 310, a squish operation may be performed as shown in FIG. 2G. In act 312, a squish wait operation may be performed as shown in FIG. 2G. After act 312, method 300 returns to act 302 to produce another layer of the object as shown in FIG. 2H.

It will be appreciated that not all of acts 304, 308, 310 and 312 may be performed in every period between successive applications of actinic radiation, although each such period may potentially include one or more of these acts. For example, a cure delay operation may be performed after the application of actinic radiation only for some layers; e.g., the additive fabrication device may be configured to not perform a cure delay when the just-fabricated layer is smaller than some threshold size. Thus optimization of speed of the additive fabrication device may include a determination of which of the above-described operations are desirable, or not, to produce an object with a desired accuracy. Furthermore, each application of an operation in method 300 may be applied differently at different times. For example, forces applied during successive separation operations may be different due to the factors considered in calculating those forces, as discussed above.

Furthermore, in some cases, certain acts of method 300 may be executed in parallel. For example, as discussed above, the wiper operation may begin in at least some cases before the separation operation has completed. For example, the wiper may be moved across the surface of the container beginning during application of forces parallel and perpendicular to the surface of the build platform upon the newly formed layer of material, and ending after application of said forces. Similarly, the squish operation may begin, in at least some cases, before the wipe operation has completed.

Figure 4A:
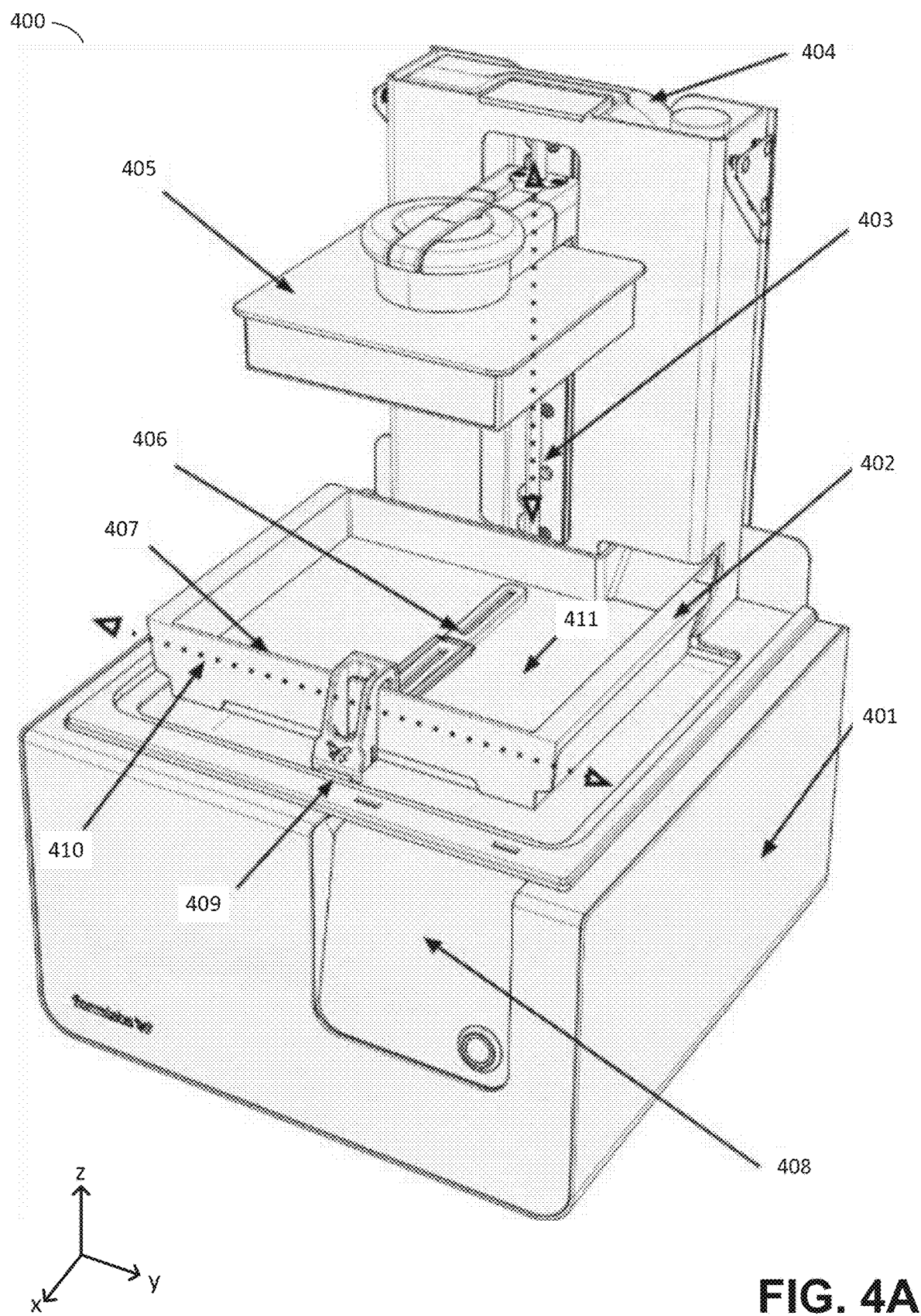
FIGS. 4A-4B are schematics showing two different views of an illustrative stereolithographic printer on which aspects of the invention may be implemented, according to some embodiments.
Figure 4B:
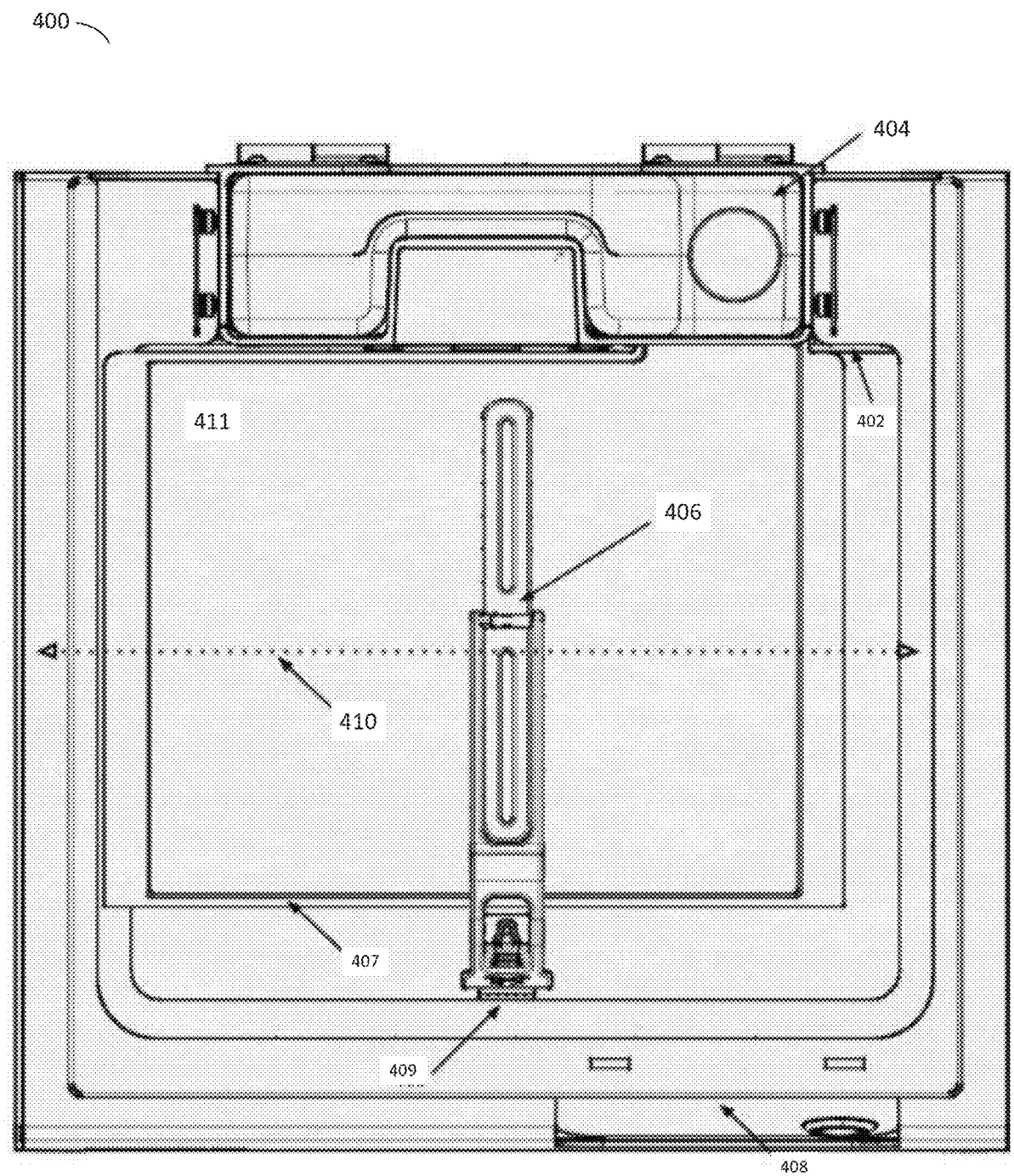

FIGS. 4A-4B are schematics showing two different views of an illustrative stereolithographic printer on which aspects of the invention may be implemented, according to some embodiments.

Illustrative stereolithographic printer 400 comprises a support base 401, a display and control panel 408, and a reservoir and dispensing system for photopolymer resin 404. The support base 401 may contain various mechanical, optical, electrical, and electronic components that may be operable to fabricate objects using the system. During operation, photopolymer resin may be dispensed from the dispensing system 404 into container 402. Build platform 405 may be positioned along the vertical axis 403 such that the bottom facing layer of an object being fabricated, or the bottom facing layer of build platform 405 itself, is a desired distance from the bottom 411 of container 402. The bottom 411 of the container 402 may be advantageously transparent to actinic radiation generated by a source located within the support base (not shown) such that liquid photopolymer resin located between the bottom 411 of container 402 and the bottom facing portion of build platform 405 or an object being fabricated thereon, may be exposed to the radiation. Upon exposure to such actinic radiation, the liquid photopolymer may be cured and attached to the bottom facing portion of build platform 405 or to an object being fabricated thereon. (FIGS. 4A-B represent a configuration of stereolithographic printer 401 prior to formation of any layers of an object on build platform 405.) A wiper 406 is additionally provided, capable of motion along the horizontal axis of motion 410 and which may be removably mounted onto the support base at 409. The wiper may be coupled to one or more actuators (e.g., stepper motors, belts attached to motor(s), etc.) that produce lateral movement of the wiper across the surface of the container.

As discussed above, a number of the optimization steps described may have one or more parameters that can be calculated based on one or more of the described factors, such as qualitative aspects of the geometry of the object being fabricated. These parameters can be calculated by at least one processor during fabrication, before fabrication, or both (i.e., at least some aspects of a given calculation may be performed pre-fabrication with others performed during fabrication.). In the description above, where an "additive fabrication system" is referenced as performing calculations, this description is intended to encompass both an additive fabrication device that includes one or more processors as well as additive fabrication device coupled to an external computing device, as the particular location at which the calculations are performed is not limited only to the device executing the fabrication process.

As such, the at least one processor calculating one or more parameters for one or more of the optimization steps may be part of the additive fabrication device itself and/or may be located in a computing device coupled via a wired and/or wireless connection to the additive fabrication device. This coupling may be temporary in nature—for example, the processor of a computing device may calculate parameter value(s) for use in an optimization step of the above-described process and wirelessly transmit that value to an additive fabrication device, which stores the value(s) and retrieves them during later fabrication. In some cases, parameters stored by an additive fabrication device may be modified during fabrication based on various aspects of the fabrication process as described above. For example, a "baseline" value for a parameter may be stored and a multiplicative factor applied to the parameter value during each layer fabrication process to produce variations in the way the parameter is applied during fabrication.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of additive fabrication wherein a plurality of layers of material are formed on a surface of a build platform, each layer of material being formed so as to contact a container in addition to the surface of the build platform and/or a previously formed layer of material, the method comprising:
    calculating, using at least one processor, for at least a first layer of the plurality of layers of the material, a first force and a second force to be applied to the first layer subsequent to the first layer being formed, the first and second forces to be applied in directions perpendicular to, and parallel to, the surface of the build platform, respectively, said calculating comprising:
        determining an area of at least one portion of the first layer that overhangs a second layer, wherein the plurality of layers comprise a sequence of layers to be formed and the second layer is to be formed earlier in the sequence of layers than the first layer; and
        calculating magnitudes of the first force and the second force based at least in part on the determined area of the at least one portion of the first layer that overhangs the second layer;
    forming the first layer of material, the first layer of material being in contact with the container and in contact with a previously formed layer of material; and
    subsequent to the forming of the first layer of the material, separating the first layer of material from the container by simultaneously applying the calculated first force to the first layer of material and applying the calculated second force to the first layer of material.

2. The method of claim 1, wherein calculating the magnitude of the first force, by the at least one processor, is further based at least in part on a length of the longest extent of the first layer of the material in the direction parallel to the surface of the build platform.

3. The method of claim 1, wherein the first layer of material is formed from a liquid photopolymer and wherein calculating the magnitude of the first force and/or the second force, by the at least one processor, is further based at least in part on a viscosity of the liquid photopolymer.

4. The method of claim 1, wherein calculating the magnitude of the first force and/or the second force, by the at least one processor, is further based at least in part on a measure of fragility of at least a portion of the first layer of material.

5. The method of claim 1, further comprising applying a preload force in the direction perpendicular to the surface of the build platform prior to application of the first force and second force.

6. The method of claim 5, further comprising calculating, by the at least one processor, the preload force based at least in part on an area of the first layer of material.

7. The method of claim 1, further comprising waiting for a predetermined cure time subsequent to the forming of the first layer of the material and prior to actively separating the first layer of material from the container.

8. The method of claim 7, further comprising calculating, by the at least one processor, the cure time based at least in part on an area of the first layer of material.

9. The method of claim 1, wherein the method further comprises:
    moving a wiper across the surface of the container;
    waiting for a predetermined wait time subsequent to moving the wiper across the surface of the container; and
    after the predetermined wait time, forming a third layer of material, the third layer of material being in contact with the first layer of material.

10. The method of claim 9, further comprising calculating, by the at least one processor, the wait time based at least in part on an area of the first layer of material.

11. The method of claim 1, wherein the first force is applied to the first layer of material by moving the build platform away from the container using at least one actuator.

12. The method of claim 1, wherein the second force is applied to the first layer of material by moving the container using at least one actuator.

13. The method of claim 1, further comprising moving a wiper across the surface of the container, wherein the wiper comprises a wiper arm and a wiper blade coupled to said wiper arm using a pivoting coupling.

14. The method of claim 13, wherein the moving of the wiper across the surface of the container begins during application of the first and second forces and ends after application of the first and second forces has completed.

15. The method of claim 1, wherein the second layer is to be formed immediately prior to the first layer in the sequence of layers.

16. The method of claim 15, wherein determining the area of the at least one portion of the first layer that overhangs the second layer comprises determining a Boolean difference between the first layer and the second layer.

17. The method of claim 1, wherein calculating the magnitudes of the first force and the second force based at least in part on the determined area of the at least one portion of the first layer that overhangs the second layer comprises calculating a numerical factor based on the determined area of the at least one portion of the first layer that overhangs the second layer.

* * * * *